United States Patent [19]

Furrow

[11] 4,213,654
[45] Jul. 22, 1980

[54] WHEEL RIM WITH NON-SLIP INTERLOCKING DEVICE

[76] Inventor: Mitchell J. Furrow, 130 S. Philadelphia St., Anaheim, Calif. 92805

[21] Appl. No.: 953,872

[22] Filed: Oct. 23, 1978

Related U.S. Application Data

[63] Continuation-in-part of Ser. No. 714,842, Aug. 16, 1976, abandoned.

[51] Int. Cl.² .............................................. B60B 23/00
[52] U.S. Cl. ........................................ 301/20; 301/95
[58] Field of Search ............ 301/10 C, 10 DC, 11 R, 301/12 R, 9 DN, 9 DP, 24, 28, 80, 63 D, 18–21; 463/375

[56] References Cited

U.S. PATENT DOCUMENTS

| | | | |
|---|---|---|---|
| 1,790,421 | 1/1931 | Holt | 301/20 |
| 2,161,351 | 6/1939 | Hoffmann | 301/20 |
| 2,173,195 | 9/1939 | Beckman | 301/11 R |
| 3,160,442 | 12/1964 | Walther et al. | 301/20 |

*Primary Examiner*—H. Grant Skaggs
*Attorney, Agent, or Firm*—Edmund M. Jaskiewicz

[57] ABSTRACT

A wheel rim such as used on a mobile home and trailer is provided with a non-slip interlocking device and has on its inner periphery a substantially radial surface which is mountable upon a wheel hub. A plurality of spaced recesses are formed in the radial surface for engagement for correspondingly spaced and shaped raised portions on a wheel hub so as to prevent slipping between the wheel rim and hub after the rim has been mounted upon the hub.

3 Claims, 7 Drawing Figures

WHEEL RIM WITH NON-SLIP INTERLOCKING DEVICE

RELATED APPLICATION

This application is a continuation-in-part of the copending application having Ser. No. 714,842 filed Aug. 16, 1976 by the same-named inventor, now abandoned.

The present invention relates to a wheel and rim assembly such as employed in a mobile home and trailer, more particularly, to a non-slip interlocking device between the assembled wheel rim and wheel hub.

The wheels used by motor vehicles and trailers hauled by the vehicles generally comprise a wheel or hub upon which is removably mounted a wheel rim and a tire is then mounted upon the rim. The rim is generally secured to the wheel or hub by clamps and bolts or by lug nuts secured upon bolts extending from the wheel and passing through openings in the wheel rim. The wheel which is generally used for trailers employed in the hauling of mobile homes and the like usually comprises a wheel rim attached to the wheel hub by clamps. While the use of clamps generally provides a satisfactory attachment of the wheel rim to the wheel there is the everpresent disadvantage of the possibility of slip between the wheel rim and the wheel hub. Such slip or relative rotative movement may cause the wheel and rim to come completely off which in turn may result in accidents and serious damage or even personal injury.

At the present time, the largest constructed mobile homes are 64 ft. long and 24 ft. wide. However, since this width of the mobile homes exceeds the maximum width permitted by traffic regulations each mobile home is divided into two units of 64 ft. long and 12 ft. wide. Each such unit is mounted upon a trailer which is supported by 6 tires mounted on 3 axles located in substantially the central portion of the trailer.

It is therefore the principal object of the present invention to provide a novel and improved non-slip interlocking device for a wheel and rim assembly which will prevent slippage between the rim and the wheel upon which it is mounted.

It is another object of the present invention to prevent accidents caused by slippage between the wheel rim and wheel in various forms of vehicles including mobile homes and trailers.

It is a further object of the present invention to provide a wheel rim which interlocks with the wheel upon being mounted thereon so as to prevent relative rotative movement therebetween.

According to one aspect of the present invention a wheel rim may comprise an annular member having a substantially channel shaped cross-section including a web portion which defines the inner periphery of the annular member. Means are provided on the inner periphery for interlocking with a wheel hub so as to prevent relative rotative movement therebetween.

The inner periphery of the annular member may be provided with a substantially radial surface which is mountable upon a wheel hub. The interlocking means may be provided in the radial surface and may comprise a plurality of recesses which are engageable with correspondingly shaped and positioned raised portions on the wheel hub.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views, a specific embodiment of the present invention will be described in detail.

Figure 1:
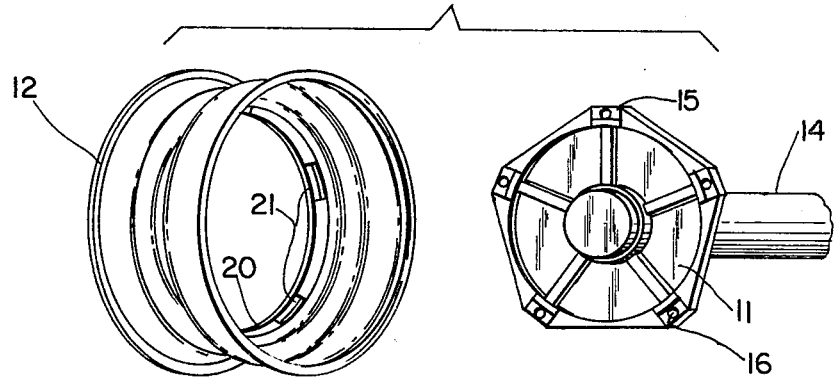
FIG. 1 is a perspective view of the dissassembled wheel rim according to the present invention and the wheel hub upon which it is mounted showing the rear of the rim and the front of the wheel hub.
Figure 2:
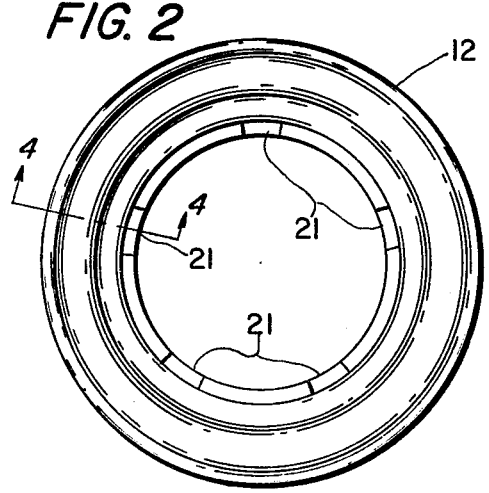
FIG. 2 is a rear elevational view of the wheel rim of FIG. 1.
Figure 3:
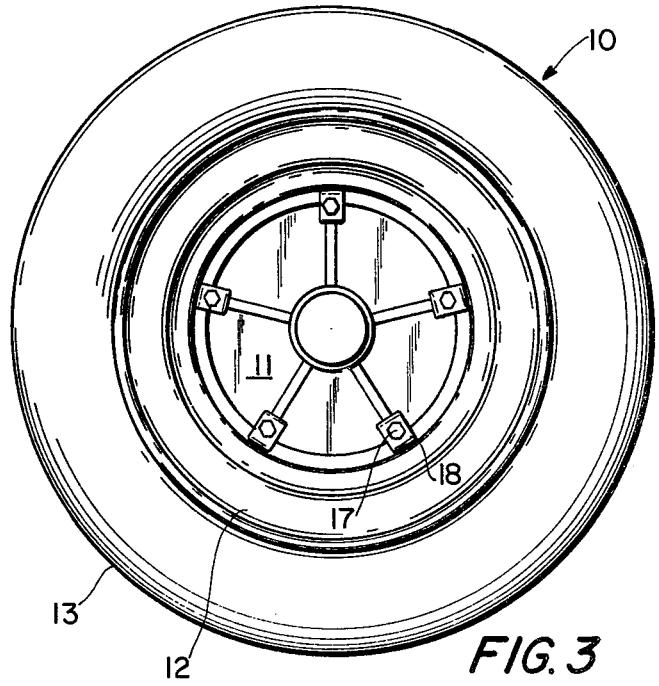
FIG. 3 is a front elevational view of the tire and wheel assembly utilizing the wheel rim of the present invention.

In FIG. 3 there is indicated generally at 10 a tire and wheel assembly comprising a wheel 11 upon which is mounted a rim 12 comprising an annular member and a tire 13 then mounted on the rim. As may be seen in further detail in FIG. 1, the wheel 11 is mounted upon an axle 14 and is provided with a plurality of axially extending raised portions or bosses 15 formed on the front face of the wheel hub and spaced circumferentially adjacent its outer periphery. The bosses are each provided with threaded bores 16 which receive bolts 17 passing through clamps 18 to secure the wheel rim upon the wheel hub.

Figure 4:
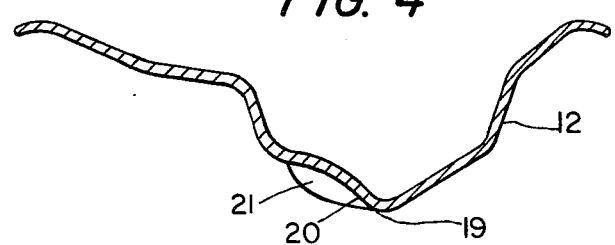
FIG. 4 is a sectional view taken along the line 4—4 of FIG. 2.
Figure 5:
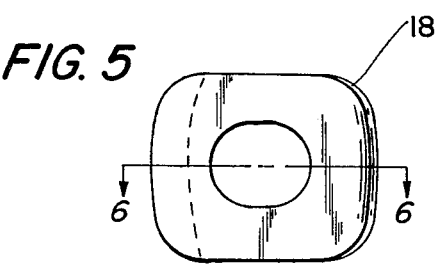
FIG. 5 is a front elevational view of a clamp used in the tire and wheel assembly of FIG. 3.
Figure 6:
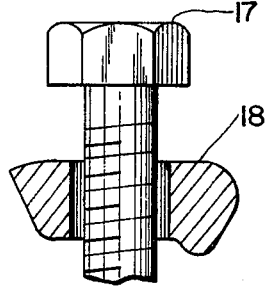
FIG. 6 is a longitudinal sectional view taken along the line 6—6 of FIG. 5 and showing the bolt utilized therewith.
Figure 7:
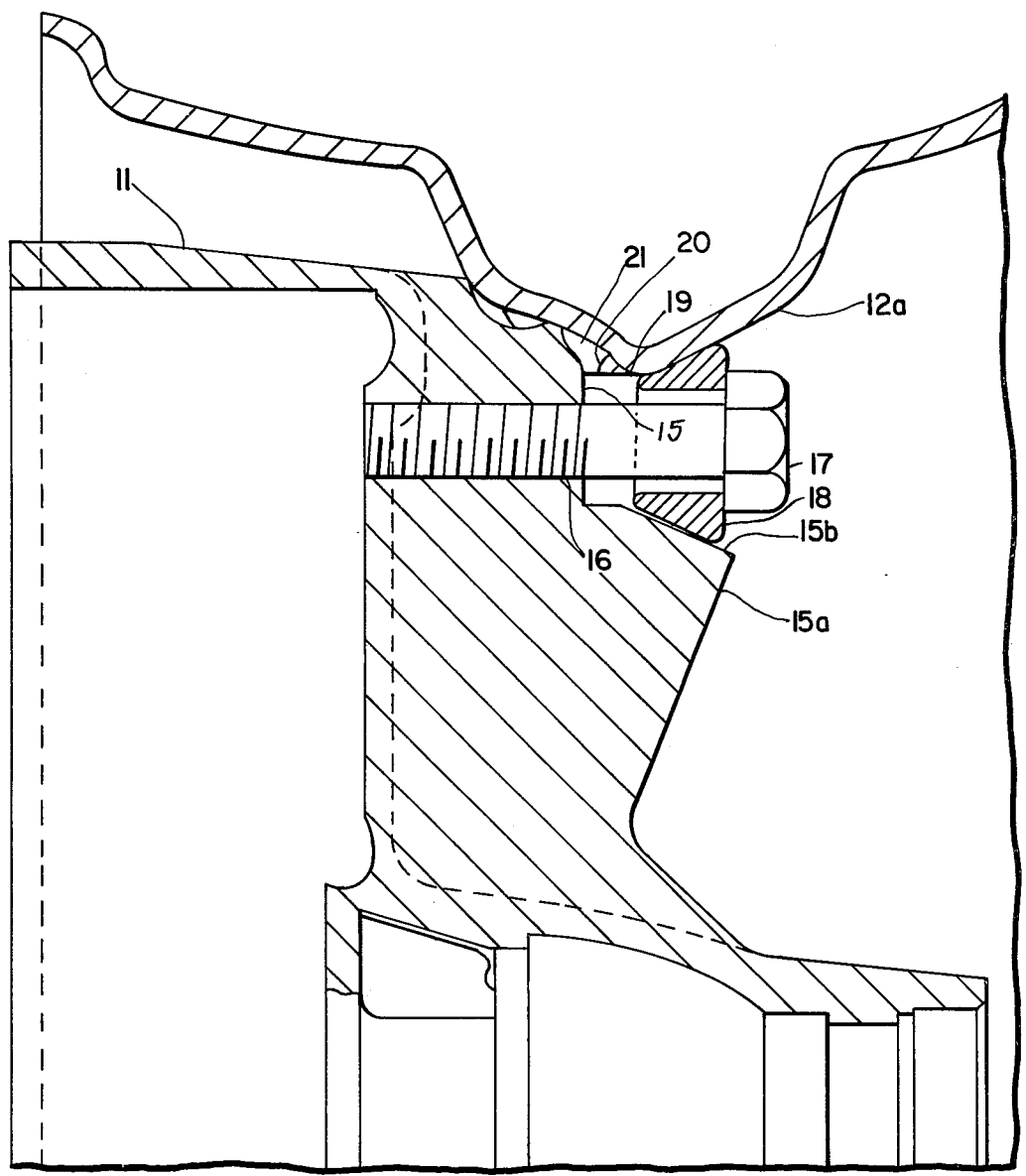
FIG. 7 is a sectional view also taken along the line 4—4 of FIG. 2 and showing in detail a Kelsey Hayes wheel hub upon which is mounted a rim according to the present invention.

The rim 12 has a substantially channeled or U-shaped cross-section as may be seen in FIGS. 4 and 7 with the web portion thereof defining an inner peripheral portion indicated at 19. Peripheral portion 19 is provided with a substantially radial surface 20 which is mounted against the outer perimeter of the wheel hub 11.

In accordance with the present invention a plurality of arcuate recesses 21 each of which are about one-fourth of an inch deep are stamped or otherwise formed in the inner radial surface 20. The recesses 21 are shaped and spaced so as to correspond to the raised portions or bosses 15 on the front face of the wheel hub adjacent its outer periphery. When the rim 12 is mounted upon the wheel 11, the rim is rotated with respect to the wheel until the recesses 21 register with the raised portions 15. At this position, the bosses will drop into the recesses which interlock with the bosses on the wheel hub and the rim will be seated firmly upon the wheel. The rim is thus prevented from moving circumferentially upon the wheel.

On the wheel hub 11 radially inwardly of the raised portions 15 there are portions 15a which protrude axially outwardly of the hub raised portions. The protruding portion 15a has an upper inclined surface 15b as shown in FIG. 7. The wheel rim 12 is provided with an inclined surface 12a which is spaced radially outwardly from the surface 15b. The surfaces 12a and 15b diverge outwardly as may be seen in FIG. 7 and are opposed from each other across the bore 16 in the raised portion 15.

When a clamp 18 is then assembled upon a bolt 17 and the bolt 17 tightened in a threaded bore 16, portions of the clamp 18 opposed from each other will engage radially spaced areas on the surfaces 12a of the wheel rim and 15b of the wheel hub.

It is to be noted that the interlocking between the rim and the wheel hub is obtained by the registering of the bosses 15 on the hub with the recesses 21 in the wheel rim. Thus, relative rotative movement between the rim and hub is prevented by this interlocking of the boss and recess. The clamps 18 and bolts 17 function primarily for the purpose of retaining the rim on the wheel hub and provide an even and uniform distribution of force between the wheel rim and hub by opposing parts of the clamp engaging radially opposed portions of the rim and hub.

The interengagement of the clamp together with the radially opposed surfaces on the hub and wheel rim and engagement between the recesses on the wheel rim and raised portions on the hub interlock the wheel hub to prevent relative rotary movement therebetween and lock the rim upon the wheel hub. This is in contrast to the present practice wherein the radial surfaces on the inner periphery of the wheel portion of the rim is clamped against the bosses. The wheel rim is thus held against rotation only by the clamping action of the clamps and bolts.

When the wheel rim is mounted upon the hub, it is preferable that two clamps are first positioned on opposing or at least alternate spokes or bosses and then tightened so that the clamps are in contact with the wheel and rim but under no torque. The remaining clamps are then placed in position and snugged up against the rim and hub as previously. Subsequently, every second bolt or nut is then tightened in sequence by progressively increasing applications of torque until all of the bolts are torqued to approximately 90 ft. pounds. As known in the industry, drivers periodically check the torque of the clamps at least within the first 100, 150 and 300 miles of driving.

It is pointed out that a significant advantage of the present invention is that the recesses on the wheel rim may be formed upon the conventional wheel rims which are now in use and generally made of steel of approximately 8 gauge. The present invention thus does not require any specialized structure in the wheel rim in order to achieve the results and advantages of this interlocking device. The present invention may thus be carried out by the initial step of stamping or otherwise forming the above-described recesses in the wheel rim. Further, the wheel rim according to the present invention can be used on the Kesley Hayes and Dexter wheel hubs which are generally used on such trailers.

The bosses or raised portions 15 on the wheel hub are provided as known in the art by forming the wheel itself with the bosses integral therewith or any other suitable manner.

Thus it can be seen that the present invention has provided a simple and effective wheel and rim assembly which will prevent slippage or relative rotative movement between the wheel rim and the wheel. The interlocking of the rim on the wheel hub is attained by inter-engaging structure on the rim and hub. The results will significantly increase the safety of transporting of mobile homes and trailers and of other operations utilizing such wheels.

It will be understood that this invention is susceptible to modification in order to adapt it to different usages and conditions, and accordingly, it is desired to comprehend such modifications within this invention as may fall within the scope of the appended claims.

What is claimed is:

1. A wheel and rim assembly for a mobile home trailer comprising a wheel hub having a plurality of circumferentially spaced axially extending raised portions on a front face of the wheel hub adjacent the outer periphery of the wheel hub and each raised portion has a threaded bore, said wheel rim comprising an annular member having a substantially channeled section including a web portion defining an inner periphery of said annular member, said inner periphery having a radially directed surface which is mountable upon said wheel hub, means on said inner periphery radially directed surface comprising a plurality of recesses corresponding in number and peripheral spacing to the plurality of raised portions and surfaces of said recesses engageable with the raised portions for interlocking with a wheel hub to prevent relative rotary movement therebetween, portions of said wheel hub radially inwardly of said raised portions protruding axially outwardly of said hub raised portions, a clamp bolt received within said threaded bore, and a clamp having an opening to receive said clamp bolt therethrough and tapering portions of said clamp opposed from each other across said opening engaging radially spaced diverging outwardly areas on said rim and said axial protruding portions of said hub when said clamp bolt is tightened and wedged between said diverging areas to lock the rim upon the wheel hub.

2. A wheel rim as claimed in claim 1 wherein said recesses are arcuate to conform to shapes of the raised portions formed on a wheel hub.

3. A wheel rim as claimed in claim 1 wherein said recesses are spaced peripherally corresponding to the spacing of clamps for securing the wheel rim to a wheel hub.

* * * * *